United States Patent
Mitsuyasu et al.

(10) Patent No.: US 9,656,670 B2
(45) Date of Patent: May 23, 2017

(54) VEHICLE TRAVEL CONTROL DEVICE

(71) Applicants: Masaki Mitsuyasu, Kawasaki (JP); Jonggap Kim, Hadano (JP); Rentaro Kuroki, Susono (JP); Takuya Hirai, Susono (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(72) Inventors: Masaki Mitsuyasu, Kawasaki (JP); Jonggap Kim, Hadano (JP); Rentaro Kuroki, Susono (JP); Takuya Hirai, Susono (JP); Masaki Matsunaga, Odawara (JP); Yasunari Kido, Hadano (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 14/439,056

(22) PCT Filed: Oct. 31, 2012

(86) PCT No.: PCT/JP2012/078235
§ 371 (c)(1),
(2) Date: Apr. 28, 2015

(87) PCT Pub. No.: WO2014/068727
PCT Pub. Date: May 8, 2014

(65) Prior Publication Data
US 2015/0307102 A1 Oct. 29, 2015

(51) Int. Cl.
*B60W 30/18* (2012.01)
*B60W 10/02* (2006.01)
(Continued)

(52) U.S. Cl.
CPC ...... *B60W 30/18072* (2013.01); *B60W 10/02* (2013.01); *B60W 10/06* (2013.01);
(Continued)

(58) Field of Classification Search
CPC ........... B60W 30/18072; B60W 30/18; B60W 30/192; B60W 10/02; B60W 10/06; B60W 10/10; B60W 10/113
See application file for complete search history.

(56) References Cited

U.S. PATENT DOCUMENTS 4,665,777 A * 5/1987 Kikuchi .............. F16H 61/0437
477/114
6,151,978 A * 11/2000 Huber ................. F16H 61/0213
477/80
(Continued)

FOREIGN PATENT DOCUMENTS

DE WO 2013159896 A1 * 10/2013 ........... B60W 10/06
JP 2002-227885 A 8/2002
WO 2012/070131 A1 5/2012

*Primary Examiner* — Adam Tissot
*Assistant Examiner* — Tommy Worden
(74) *Attorney, Agent, or Firm* — Oliff PLC (57) ABSTRACT

A running control device of a vehicle includes an engine, a connecting/disconnecting device separating the engine and wheels, and a transmission transmitting power of the engine toward the wheels, the running control device being configured to execute a normal running-mode performed by using the power of the engine with the engine and the wheels coupled, a free-run inertia running-mode that is performed by separating the engine and the wheels and stopping the engine during running, and a neutral inertia running-mode that is a performed by separating the engine and the wheels (Continued)

and operating the engine in a self-sustaining manner during running, the running control device setting a gear ratio of the transmission on a low vehicle speed side in the case of return from the free-run inertia running-mode to the normal running-mode as compared to the case of return from the neutral inertia running-mode to the normal running-mode.

7 Claims, 7 Drawing Sheets

(51) Int. Cl.
    *B60W 10/06*     (2006.01)
    *B60W 10/10*     (2012.01)
    *F16H 61/02*     (2006.01)
    *F16H 63/50*     (2006.01)
    *F16H 59/18*     (2006.01)

(52) U.S. Cl.
    CPC ...... *B60W 10/10* (2013.01); *B60W 30/18172* (2013.01); *F16H 61/0213* (2013.01); *B60W 2030/1809* (2013.01); *B60W 2030/18081* (2013.01); *B60W 2710/105* (2013.01); *F16H 63/50* (2013.01); *F16H 2059/186* (2013.01); *F16H 2061/0234* (2013.01)

(56) References Cited

U.S. PATENT DOCUMENTS

| | | | | |
|---|---|---|---|---|
| 8,439,801 B2 * | 5/2013 | Preisner | ............... | B60W 10/02 477/77 |
| 8,747,280 B2 * | 6/2014 | Hoshiba | ............... | B60W 10/06 477/115 |
| 9,267,448 B2 * | 2/2016 | Kuroki | ............... | F02D 41/0087 |
| 9,393,965 B2 * | 7/2016 | Schiergl | ............... | B60W 10/06 |
| 9,421,977 B2 * | 8/2016 | Kuroki | ............... | F02D 41/045 |
| 2004/0029678 A1 * | 2/2004 | Kayukawa | ............ | B60K 6/365 477/15 |
| 2010/0151991 A1 * | 6/2010 | Mair | ............... | B60W 10/02 477/77 |
| 2010/0324798 A1 * | 12/2010 | Rew | ............... | B60K 6/365 701/99 |
| 2011/0054765 A1 * | 3/2011 | Lewis | ............... | F02D 41/062 701/112 |
| 2011/0203860 A1 * | 8/2011 | Sauvlet | ............... | B60K 6/48 180/65.28 |
| 2013/0237372 A1 * | 9/2013 | Ueki | ............... | F02D 29/02 477/86 |
| 2014/0114542 A1 * | 4/2014 | Abdul-Rasool | ........ | B60W 10/02 701/65 |
| 2014/0288807 A1 * | 9/2014 | Tribulowski | ........ | F02N 11/0818 701/112 |
| 2015/0166066 A1 * | 6/2015 | Suzuki | ............... | F02N 11/0833 477/174 |
| 2015/0266480 A1 * | 9/2015 | Kuroki | ............... | F02D 41/045 477/174 |
| 2015/0291171 A1 * | 10/2015 | Kuroki | ............... | F02D 41/12 701/70 |
| 2015/0298700 A1 * | 10/2015 | Kuroki | ............... | F02D 13/0211 477/181 |
| 2015/0307102 A1 * | 10/2015 | Mitsuyasu | ...... | B60W 30/18172 701/48 |
| 2015/0307103 A1 * | 10/2015 | Kuroki | ............... | F16H 61/21 701/70 |

* cited by examiner

FIG.2

| RUNNING MODE | ENGINE 14 | CLUTCH C1 |
|---|---|---|
| NORMAL RUNNING | OPERATED | ENGAGED |
| FREE-RUN INERTIA RUNNING | F/C; ROTATION STOP | RELEASED |
| NEUTRAL INERTIA RUNNING | IDLE ROTATION | RELEASED |

VEHICLE TRAVEL CONTROL DEVICE

TECHNICAL FIELD

The present invention relates to a running control device of a vehicle capable of executing an inertia running mode with an engine and wheels separated and particularly to a technique at the time of return from the inertia running mode to a normal running mode with the engine and the wheels coupled.

BACKGROUND ART

To extend a running distance and improve fuel consumption in a vehicle including a connecting/disconnecting device (e.g., a clutch) separating an engine and wheels and a transmission transmitting the power of the engine toward the wheels, it is conceivable that the vehicle is allowed to perform an inertia running mode when a predetermined condition is satisfied during a normal running mode performed by the power of the engine while the engine and the wheels are coupled. For example, in Patent Document 1, a control device of a vehicle is proposed that releases a clutch during running of the vehicle to separate an engine and wheels for allowing the vehicle to perform the inertia running mode on the condition of accelerator-off etc. Patent Document 1 describes that a state of the engine during the inertia running mode is an "idle state" or a "stop state" without particular distinction. In Patent Document 1, conditions for canceling such an inertia running mode (i.e., conditions for returning to a normal running mode) are exemplified as accelerator-on, brake-on, steering of a predetermined steering angle or more, a shift lever operation, an inter-vehicle distance of a predetermined value or less, a reduction in vehicle speed, an increase in vehicle speed on a descending road, etc.

PRIOR ART DOCUMENT

Patent Document

Patent Document 1: Japanese Laid-Open Patent Publication No. 2002-227885

SUMMARY OF THE INVENTION

Problem to Be Solved by the Invention

In the case of return from the inertia running mode to the normal running mode because an accelerator is turned on during the inertia running mode performed with an engine and wheels separated, it is considered that a user desires prompt acceleration. To satisfy such a user's request, it is conceivable that an upper limit value of a drive force (having the same meaning as a drive torque etc.) capable of being generated (i.e., an absolute value of the drive force capable of being generated) is preliminarily made larger by setting a gear ratio of a transmission on a low vehicle speed side at the time of return from the inertia running mode so as to enhance acceleration performance after the drive force starts being generated. However, no consideration is given to the fact that a procedure of returning from the inertia running mode differs depending on whether the state of the engine during the inertia running mode is set to the "idle state" or the "stop state". Specifically, when the state of the engine is set to the "idle state", the procedure is to engage a clutch to accelerate a vehicle after the return condition is satisfied. When the state of the engine is set to the "stop state", the procedure is to start the engine and then engage a clutch to accelerate a vehicle after the return condition is satisfied. Therefore, if the engine is in the "stop state", the engine must be started at the time of return from the inertia running mode and, therefore, the responsiveness until generation of a user's desired drive force is deteriorated as compared to when the engine is in the "idle state". On the other hand, at the time of engagement of the clutch, which is the procedure common to the "idle state" and the "stop state", an engagement shock of the clutch occurs. It is known that when the gear ratio of the transmission is on the low vehicle speed side, the sensitivity to the engagement shock becomes higher since the engagement shock of the clutch increases by the gear ratio.

Since the responsiveness until generation of the desired drive force can be improved by setting the gear ratio of the transmission on the low vehicle speed side to enhance the acceleration performance, it is conceivable that the gear ratio of the transmission is set to the low vehicle speed side in both the "idle state" and the "stop state" similarly to put importance on the responsiveness. In this case, even though the responsiveness is originally not deteriorated in the "idle state" as compared to the "stop state", the engagement shock of the clutch may be increased by setting the gear ratio on the low vehicle speed side. On the other hand, if the gear ratio of the transmission is not set on the low vehicle speed side so as to put importance on suppression of the engagement shock of the clutch, the responsiveness of the "stop state" may further deteriorate. The problem as described above is unknown and no proposal has hitherto been made on setting a gear ratio of the transmission such that both the improvement in the responsiveness and the suppression of the engagement shock are satisfied at the time of return to the normal running mode by focusing attention on a difference between the "stop state" and the "idle state" of the engine during the inertia running mode.

The present invention was conceived in view of the situations and it is therefore an object of the present invention to provide a running control device of a vehicle capable of preventing a user from having a feeling of strangeness at the time of return to a normal running mode from an inertia running mode performed with an engine and wheels separated, in terms of the responsiveness until a desired drive force is generated and the shock when the engine and the wheels are coupled.

Means for Solving the Problem

To achieve the object, the first aspect of the invention provides a running control device of a vehicle including (a) an engine, a connecting/disconnecting device separating the engine and wheels, and a transmission transmitting power of the engine toward the wheels, the running control device being configured to execute a normal running mode performed by using the power of the engine with the engine and the wheels coupled, a free-run inertia running mode that is an inertia running mode performed by separating the engine and the wheels and stopping the engine during running, and a neutral inertia running mode that is an inertia running mode performed by separating the engine and the wheels and operating the engine in a self-sustaining manner during running, (b) the running control device setting a gear ratio of the transmission on a low vehicle speed side in the case of return from the free-run inertia running mode to the normal running mode as compared to the case of return from the neutral inertia running mode to the normal running mode.

Effects of the Invention

Consequently, by changing the gear ratio of the transmission at the time of return to the normal running mode based on the state of the engine during an inertia running mode, the gear ratio on the low vehicle speed side (low gear side) is used in the case of the free-run inertia running mode with the engine stopped for returning to the normal running mode so as to put importance on an absolute value of the drive force capable of being generated after return (that is, the improvement in the responsiveness until generation of the desired drive force), while the gear ratio on the high vehicle speed side (high gear side) is used in the case of the neutral inertia running mode with the engine operating in a self-sustaining manner for returning to the normal running mode so as to put importance on the suppression of the shock generated when the engine is coupled to the wheels. Therefore, a user can be prevented from having a feeling of strangeness at the time of return from the inertia running mode to the normal running mode in terms of the responsiveness and the shock. In other words, both the improvement in the responsiveness and the suppression of the shock can be satisfied at the time of return from the inertia running mode to the normal running mode.

The second aspect of the invention provides the running control device of a vehicle recited in the first aspect of the invention, wherein one of a plurality of conditions for returning to the normal running mode is a condition that is an increase in a drive demand amount, wherein the running control device sets the gear ratio of the transmission on the low vehicle speed side at the time of return to the normal running mode associated with the increase in the drive demand amount, and sets the gear ratio of the transmission to a gear ratio for the normal running mode at the time of return to the normal running mode associated with a condition other than the increase in the drive demand amount. Consequently, although if control of changing the gear ratio of the transmission at the time of return to the normal running mode based on the state of the engine during an inertia running mode is provided when it is not the time of return to the normal running mode associated with an increase in the drive demand amount, the shock generated when the engine is coupled to the wheels varies due to a difference in the state of the engine and possibly gives a feeling of strangeness to a user, the feeling of strangeness is avoided because the control is not provided so as not to put importance on the responsiveness until generation of the desired drive force when it is not the time of return to the normal running mode associated with an increase in the drive demand amount.

The third aspect of the invention provides the running control device of a vehicle recited in the first or second aspect of the invention, wherein the running control device of a vehicle has a predefined relationship determining a gear ratio of the transmission for the normal running mode, and wherein the running control device sets the gear ratio of the transmission on the low vehicle speed side relative to the gear ratio determined from the predefined relationship in the case of return from the free-run inertia running mode to the normal running mode as compared to the case of return from the neutral inertia running mode to the normal running mode. Consequently, the gear ratio of the transmission can certainly be set on the low vehicle speed side in the case of return from the free-run inertia running mode to the normal running mode as compared to the case of return from the neutral inertia running mode to the normal running mode.

The fourth aspect of the invention provides the running control device of a vehicle recited in any one of the first to third aspects of the invention, wherein the running control device of a vehicle has a predefined relationship for free-run inertia running mode determining a gear ratio of the transmission at the time of return from the free-run inertia running mode to the normal running mode and a predefined relationship for neutral inertia running mode determining a gear ratio of the transmission at the time of return from the neutral inertia running mode to the normal running mode, and wherein the relationship for free-run inertia running mode has a gear ratio of the transmission set on the low vehicle speed side as compared to the relationship for neutral inertia running mode. Consequently, the gear ratio of the transmission can certainly be set on the low vehicle speed side in the case of return from the free-run inertia running mode to the normal running mode as compared to the case of return from the neutral inertia running mode to the normal running mode.

To achieve the object, the fifth aspect of the invention provides a running control device of a vehicle including (a) an engine, a connecting/disconnecting device separating the engine and wheels, and a transmission transmitting power of the engine toward the wheels, the running control device being configured to execute a normal running mode performed by using the power of the engine with the engine and the wheels coupled, a free-run inertia running mode that is an inertia running mode performed by separating the engine and the wheels and stopping the engine during running, and a neutral inertia running mode that is an inertia running mode performed by separating the engine and the wheels and operating the engine in a self-sustaining manner during running, (b) the running control device having a predefined relationship determining a gear ratio of the transmission for the normal running mode, (c) the gear ratio of the transmission being set on a low vehicle speed side relative to the gear ratio determined from the predefined relationship in the case of return from the free-run inertia running mode to the normal running mode as compared to the case of return from the neutral inertia running mode to the normal running mode.

Consequently, by changing the gear ratio of the transmission at the time of return to the normal running mode based on the state of the engine during an inertia running mode, the gear ratio on the low vehicle speed side is used in the case of the free-run inertia running mode with the engine stopped for returning to the normal running mode so as to put importance on an absolute value of the drive force capable of being generated after return (that is, the improvement in the responsiveness until generation of the desired drive force), while the gear ratio on the high vehicle speed side is used in the case of the neutral inertia running mode with the engine operating in a self-sustaining manner for returning to the normal running mode so as to put importance on the suppression of the shock generated when the engine is coupled to the wheels. Therefore, a user can be prevented from having a feeling of strangeness at the time of return from the inertia running mode to the normal running mode in terms of the responsiveness and the shock. In other words, both the improvement in the responsiveness and the suppression of the shock can be satisfied at the time of return from the inertia running mode to the normal running mode.

To achieve the object, the sixth aspect of the invention provides a running control device of a vehicle including (a) an engine, a connecting/disconnecting device separating the engine and wheels, and a transmission transmitting power of the engine toward the wheels, the running control device being configured to execute a normal running mode performed by using the power of the engine with the engine and the wheels coupled, a free-run inertia running mode that is an inertia running mode performed by separating the engine and the wheels and stopping the engine during running, and a neutral inertia running mode that is an inertia running mode performed by separating the engine and the wheels and operating the engine in a self-sustaining manner during running, the running control device having (b) a predefined relationship for free-run inertia running mode determining a gear ratio of the transmission at the time of return from the free-run inertia running mode to the normal running mode and (c) a predefined relationship for neutral inertia running mode determining a gear ratio of the transmission at the time of return from the neutral inertia running mode to the normal running mode, (d) the relationship for free-run inertia running mode having the gear ratio of the transmission set on the low vehicle speed side as compared to the relationship for neutral inertia running mode.

Consequently, by changing the gear ratio of the transmission at the time of return to the normal running mode based on the state of the engine during an inertia running mode, the gear ratio on the low vehicle speed side is used in the case of the free-run inertia running mode with the engine stopped for returning to the normal running mode so as to put importance on an absolute value of the drive force capable of being generated after return (that is, the improvement in the responsiveness until generation of the desired drive force), while the gear ratio on the high vehicle speed side is used in the case of the neutral inertia running mode with the engine operating in a self-sustaining manner for returning to the normal running mode so as to put importance on the suppression of the shock generated when the engine is coupled to the wheels. Therefore, a user can be prevented from having a feeling of strangeness at the time of return from the inertia running mode to the normal running mode in, terms of the responsiveness and the shock. In other words, both the improvement in the responsiveness and the suppression of the shock can be satisfied at the time of return from the inertia running mode to the normal running mode.

The seventh aspect of the invention provides the running control device of a vehicle recited in any one of the first to sixth aspects of the invention, wherein a gear ratio of the transmission at the time of return from the neutral inertia running mode to the normal running mode is a gear ratio of the transmission for the normal running mode. Consequently, the gear ratio of the transmission can be set on the low vehicle speed side in the case of return from the free-run inertia running mode to the normal running mode.

MODE FOR CARRYING OUT THE INVENTION

In the present invention, preferably, the transmission is made up of an automatic transmission or of an automatic transmission having a fluid power transmission device. For example, this automatic transmission is made up of a known planetary gear type automatic transmission, a synchronous meshing type parallel two-shaft automatic transmission that is a known synchronous meshing type parallel two-shaft transmission and that has gear stages automatically switched by a hydraulic actuator, a so-called DCT (Dual Clutch Transmission) that is a synchronous meshing type parallel two-shaft automatic transmission and that is of a type having two systems of input shafts, or a known belt type continuously variable transmission or a toroidal type continuously variable transmission, etc.

Although the connecting/disconnecting device is preferably implemented by using a friction engagement type clutch or brake, connecting/disconnecting devices of various types can be employed including electrically controlling a reaction force to connect and disconnect the power transmission. An automatic transmission including pluralities of clutches and brakes and capable of being neutral is also usable.

Preferably, the engine is an internal combustion engine such as a gasoline engine and a diesel engine generating power from combustion of fuel, for example. Although the vehicle may include at least the engine as a drive force source, the vehicle may include another drive force source such as an electric motor in addition to the engine.

An example of the present invention will now be described in detail with reference to the drawings.

First Example

Figure 1:
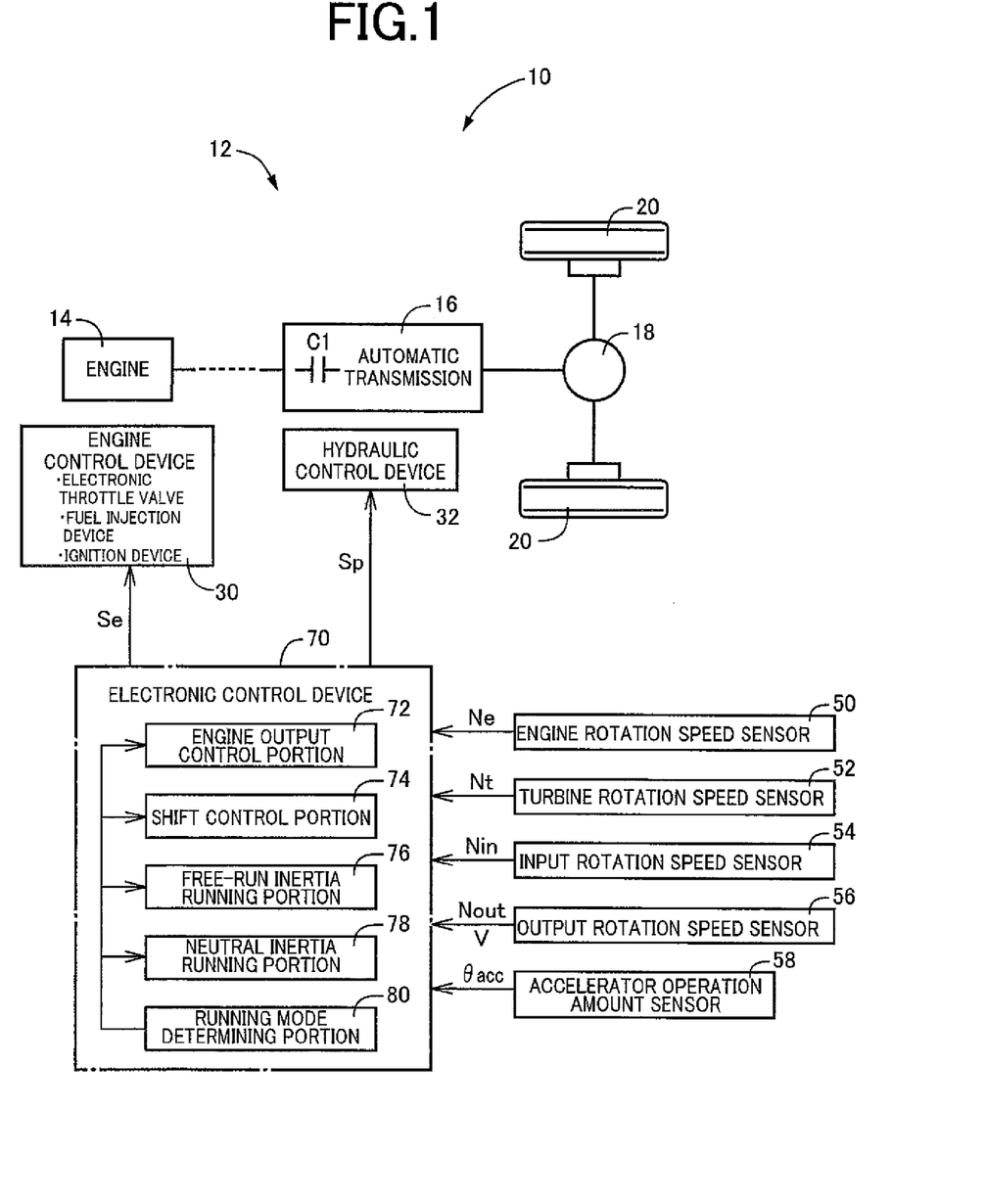
FIG. 1 is a diagram for explaining a general configuration of a drive device included in a vehicle to which the present invention is applied, and is a diagram for explaining a main portion of a control system in the vehicle.

FIG. 1 is a diagram for explaining a general configuration of a drive device 12 included in a vehicle 10 to which the present invention is applied, and is a diagram for explaining a main portion of a control system for various controls in the vehicle 10. In FIG. 1, the drive device 12 includes an engine 14 and an automatic transmission 16 and the power of the engine 14 acting as a drive force source is transmitted from the automatic transmission 16 via a differential gear device 18 to left and right wheels 20. For example, a damper device and a power transmission device such as a torque converter are disposed between the engine 14 and the automatic transmission 16, and a motor generator acting as a drive force source can also be disposed therebetween.

The engine 14 includes an engine control device 30 having various pieces of equipment necessary for output control of the engine 14, such as an electronic throttle valve, a fuel injection device, and an ignition device. The electronic throttle valve, the fuel injection device, and the ignition device control an intake air amount, a fuel supply amount, and ignition timing, respectively, and are basically controlled depending on an operation amount of an accelerator pedal (an accelerator operation amount) θacc corresponding to a drive demand amount for the vehicle 10 from a driver. The fuel injection device can stop the fuel supply (perform a fuel cut F/C) at the time of accelerator-off when the accelerator operation amount θacc is determined as being zero even during running of the vehicle.

The automatic transmission 16 is a stepped automatic transmission of a planetary gear type etc., having a plurality of gear stages with different gear ratios e established depending on engaged/released states of a plurality of hydraulic friction engagement devices (clutches and brakes). In the automatic transmission 16, each of the hydraulic friction engagement devices is subjected to engagement/release control by electromagnetic hydraulic control valves, switching valves, etc. disposed in a hydraulic control device 32 so that a predetermined gear stage is established depending on a driver's accelerator operation, a vehicle speed V, etc. A clutch C1 acts as an input clutch of the automatic transmission 16 and is a hydraulic friction engagement device subjected to the engagement/release control by the hydraulic control device 32 in the same way. The clutch C1 corresponds to a connecting/disconnecting device connecting and disconnecting the engine 14 and the wheels 20. The automatic transmission 16 may be implemented by using a continuously variable transmission of a belt type etc., instead of a stepped transmission.

The vehicle 10 includes an electronic control device 70 including a running control device of the vehicle 10 related to the engagement/release control of the clutch C1, for example. The electronic control device 70 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 70 provides the output control of the engine 14, the shift control of the automatic transmission 16, the torque capacity control of the clutch C1, etc., and is configured separately as needed for the engine control, the hydraulic control, etc. The electronic control device 70 is supplied with each of various signals (e.g., an engine rotation speed Ne that is a rotation speed of the engine 14, a turbine rotation speed Nt that is a rotation speed of a turbine shaft of the torque converter, a transmission input rotation speed Nin that is an input rotation speed of the automatic transmission 16, a transmission output rotation speed Nout that is an output rotation speed of the automatic transmission 16 corresponding to the vehicle speed V, and the accelerator operation amount θacc) based on detection values from various sensors (e.g., an engine rotation speed sensor 50, a turbine rotation speed sensor 52, an input rotation speed sensor 54, an output rotation speed sensor 56, and an accelerator operation amount sensor 58). The electronic control device 70 outputs, for example, an engine output control command signal Se for the output control of the engine 14, an oil pressure command signal Sp for the engagement control of the clutch C1 and the shift control of the automatic transmission 16 to the engine control device 30 and the hydraulic control device 32, respectively.

The electronic control device 70 functionally includes an engine output control means, i.e., an engine output control portion 72, a shift control means, i.e., a shift control portion 74, a free-run inertia running means, i.e., a free-run inertia running portion 76, a neutral inertia running means, i.e., a neutral inertia running portion 78, and a running mode determining means, i.e., a running mode determining portion 80.

The engine output control portion 72 outputs to the engine control device 30 the engine output control command signals Se controlling opening/closing of the electronic throttle valve, controlling the fuel injection amount from the fuel injection device, and controlling the ignition timing of the ignition device such that a requested engine torque Te (hereinafter, a demand engine torque Tedem) is acquired, for example. The engine output control portion 72 calculates a demand drive force Fdem as a drive demand amount based on the actual accelerator operation amount θacc and vehicle speed V from a relationship (a drive force map) not depicted stored in advance between the vehicle speed V and the demand drive force Fdem by using the accelerator operation amount θacc as a parameter, for example, and calculates the demand engine torque Tedem at which the demand drive force Fdem is acquired, based on the gear ratio e at the current gear stage of the automatic transmission 16 etc. The drive demand amount can be implemented by using not only the demand drive force Fdem [N] at the wheels 20 but also a demand drive torque Touttgt [Nm] at the wheels 20, a demand drive power [W] at the wheels 20, a demand transmission output torque of the automatic transmission 16, a demand transmission input torque of the automatic transmission 16, and the demand engine torque Tedem. The drive demand amount can also be implemented by simply using the accelerator operation amount θacc [%], a throttle valve opening degree [%], an intake air amount [g/sec] of the engine 14, etc.

The shift control portion 74 provides the shift control of the automatic transmission 16. Specifically, the shift control portion 74 makes a shift determination based on a vehicle state indicated by the actual vehicle speed V and the drive demand amount from a known relationship (a shift map, a shift diagram) defined and stored in advance by using the vehicle speed V and the drive demand amount as variables. If it is determined that a shift of the automatic transmission 16 should be performed, the shift control portion 74 outputs to the hydraulic control device 32 the oil pressure command signal Sp for engaging and/or releasing the hydraulic friction engagement devices involved with the shift of the automatic transmission 16 such that the determined gear stage is achieved.

Figure 2:
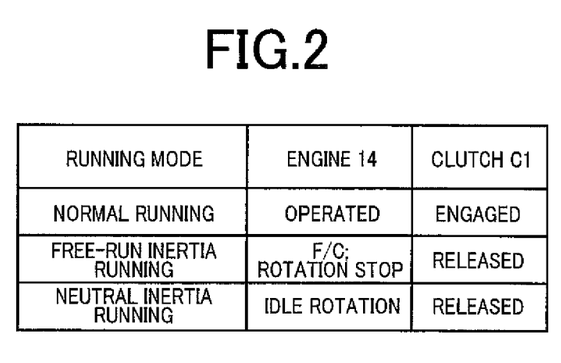
FIG. 2 is a diagram for explaining three running modes performed in the vehicle depicted in FIG. 1.

The engine output control portion 72 and the shift control portion 74, the free-run inertia running portion 76, and the neutral inertia running portion 78 perform three respective running modes depicted in FIG. 2. The engine output control portion 72 and the shift control portion 74 perform a normal running mode (hereinafter also referred as "normal running") performed by using the power of the engine 14 with the engine 14 and the wheels 20 coupled (i.e., with the clutch C1 engaged). Specifically, as described above, the engine output control portion 72 provides the output control of the engine 14 such that the drive demand amount is acquired, and the shift control portion 74 provides the shift control of the automatic transmission 16 including engagement of the clutch C1 based on the vehicle state indicated by the actual vehicle speed V and the drive demand amount from the shift map.

The free-run inertia running portion 76 performs a free-run inertia running mode (hereinafter also referred as "free-run inertia running") (also referred to as a free-run coasting mode) that is an inertia running mode performed by separating the engine 14 and the wheels 20 and stopping the engine 14 during running. Specifically, the free-run inertia running portion 76 releases the clutch C1 to separate the engine 14 from the wheels 20 and performs the fuel cut F/C stopping the fuel supply to the engine 14, thereby performing the inertia running mode (also referred to as a coasting mode) with the rotation of the engine 14 stopped. Since the release of the clutch C1 results in an engine brake force of substantially zero in the free-run inertia running mode, a reduction in running resistance extends the running distance in the inertia running mode, and fuel consumption can further be improved in combination with the fuel cut F/C.

The neutral inertia running portion 78 performs a neutral inertia running mode (hereinafter also referred as "neutral inertia running") (also referred to as an N-coasting mode) that is an inertia running mode performed by separating the engine 14 and the wheels 20 and operating the engine 14 in a self-sustaining manner during running. Specifically, the neutral inertia running portion 78 releases the clutch C1 to separate the engine 14 from the wheels 20 and supplies fuel to the engine 14 to perform the inertia running mode with the engine 14 operated in an idling state. Although the engine 14 is operated in the idling state in the neutral inertia running mode, since the clutch C1 is released, the running distance in the inertia running mode is extended and the effect of improving fuel consumption is acquired to some extent.

The running mode determining portion 80 determines in which mode the vehicle should be placed from the three running modes, i.e., the normal running mode, the free-run inertia running mode, and the neutral inertia running mode, and switches to the determined running mode or determines which mode the vehicle is actually running in. Specifically, for example, during accelerator-on when the accelerator operation amount θacc is not determined as being zero, the running mode determining portion 80 basically determines to perform the normal running mode. On the other hand, for example, if the accelerator is continuously turned off for a predetermined time or longer during the normal running mode, the running mode determining portion 80 determines to perform the free-run inertia running mode or the neutral inertia running mode based on predefined inertia running conditions. The inertia running conditions are defined in advance such that the free-run inertia running mode and the neutral inertia running mode are performed in respective regions having completely different vehicle states by using classification according to the vehicle speed V and a brake operation force, for example. Alternatively, the inertia running conditions may be defined in advance such that, for example, the free-run inertia running mode with a high fuel consumption improvement effect is basically performed and that the neutral inertia running mode is performed if the engine 14 must be warmed up, if a battery must be charged by the power of the engine 14, or if a mechanical oil pump must be driven by the power of the engine 14. Alternatively, the inertia running conditions may be defined in advance such that the free-run inertia running mode and the neutral inertia running mode are performed in regions of vehicle states partially overlapping with each other by using classification according to the vehicle speed V and a brake operation force, for example, and may be defined in advance such that either one is executed in the overlapping region based on the necessity of the warm-up of the engine 14 etc.

If a predetermined return condition for returning to the normal running mode (i.e., a cancel condition for canceling the inertia running mode) is satisfied during the free-run inertia running mode or the neutral inertia running mode, the running mode determining portion 80 cancels the inertia running mode and determines to return to the normal running mode. The predetermined return condition is any one of the following multiple types of conditions. For example, the return condition is a condition A that is an increase in the drive demand amount (e.g., accelerator-on). Alternatively, the return condition is a condition B such as a brake operation force equal to or greater than a predetermined brake operation force, a steering angle equal to or greater than a predetermined steering angle, or an inter-vehicle distance equal to or less than a predetermined inter-vehicle distance. If the condition B is satisfied, an engine brake running mode (hereinafter also referred as "engine brake running") may be performed that applies an engine brake from the driven rotation of the engine 14 with the engine 14 and the wheels 20 coupled, instead of returning to the normal running mode.

The running mode determining portion 80 determines the running mode of the actual running being performed out of the normal running mode, the free-run inertia running mode, and the neutral inertia running mode, based on a state of the engine 14 and a state of the clutch C1 as depicted in FIG. 2, for example. Alternatively, if a flag indicative of the running mode is defined in advance, the running mode determining portion 80 may determine the running mode of the actual running being performed based on the actual flag.

If the return condition at the time of return from the free-run inertia running mode or the neutral inertia running mode to the normal running mode is the condition A (e.g., accelerator-on), it is desirable to promptly accelerate the vehicle 10. For prompt acceleration, for example, it is conceivable that the responsiveness until generation of a user's desired drive force is improved by promptly engaging the clutch C1 to reduce a time until the drive force is generated or by increasing an absolute value of the drive force capable of being generated after the engagement of the clutch C1 to enhance acceleration performance. To enhance the acceleration performance, it is conceivable that the gear ratio e of the automatic transmission 16 at the time of return to the normal running mode is set on a relatively low vehicle speed side; however, since an engagement shock of the clutch C1 is increased by the gear ratio, the engagement shock may be increased when the clutch C1 is promptly engaged. On the other hand, in the case of return from the free-run inertia running mode to the normal running mode, the engine 14 must be started and, therefore, the responsiveness is originally deteriorated as compared to the case of return from the neutral inertia running mode to the normal running mode. If the gear ratio e at the time of return to the normal running mode is set on the relatively low vehicle speed side in both the free-run inertia running mode and the neutral inertia running mode to put importance on the responsiveness, the engagement shock of the clutch C1 may increase in the return from the neutral inertia running mode even though the responsiveness is originally not deteriorated. On the other hand, if the gear ratio e is not set on the low vehicle speed side so as to put importance on suppression of the engagement shock of the clutch C1, the responsiveness may further deteriorate in the return from the free-run inertia running mode even though the engagement shock is less noticeable since an engine start shock originally occurs. Therefore, the respective gear ratios e of the automatic transmission 16 at the time of return to the normal running mode must properly be set for the free-run inertia running mode and the neutral inertia running mode.

Thus, the shift control portion 74 provides return-time gear ratio change control of setting the gear ratio e of the automatic transmission 16 on the low vehicle speed side in the case of return from the free-run inertia running mode to the normal running mode as compared to the case of return from the neutral inertia running mode to the normal running mode. The problem as described above occurs at the time of return on the condition A. Therefore, the shift control portion 74 provides the return-time gear ratio change control at the time of return to the normal running mode associated with an increase in the drive demand amount (e.g., associated with satisfaction of the condition A), and sets the gear ratio e of the automatic transmission 16 to the gear ratio for the normal running mode without providing the return-time gear ratio change control at the time of return to the normal running mode associated with a condition other than an increase in the drive demand amount (e.g., associated with satisfaction of the condition B).

Figure 3:
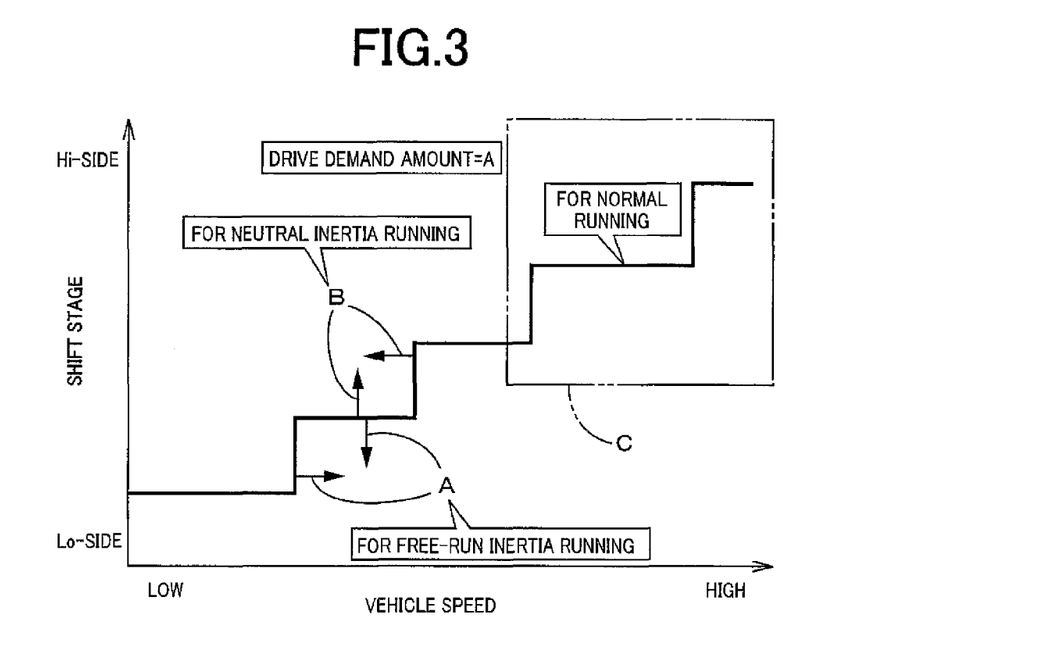
FIG. 3 is a diagram for explaining a gear ratio of an automatic transmission set at the time of return from the inertia running mode and depicts the case of using a normal running shift map.
Figure 4:
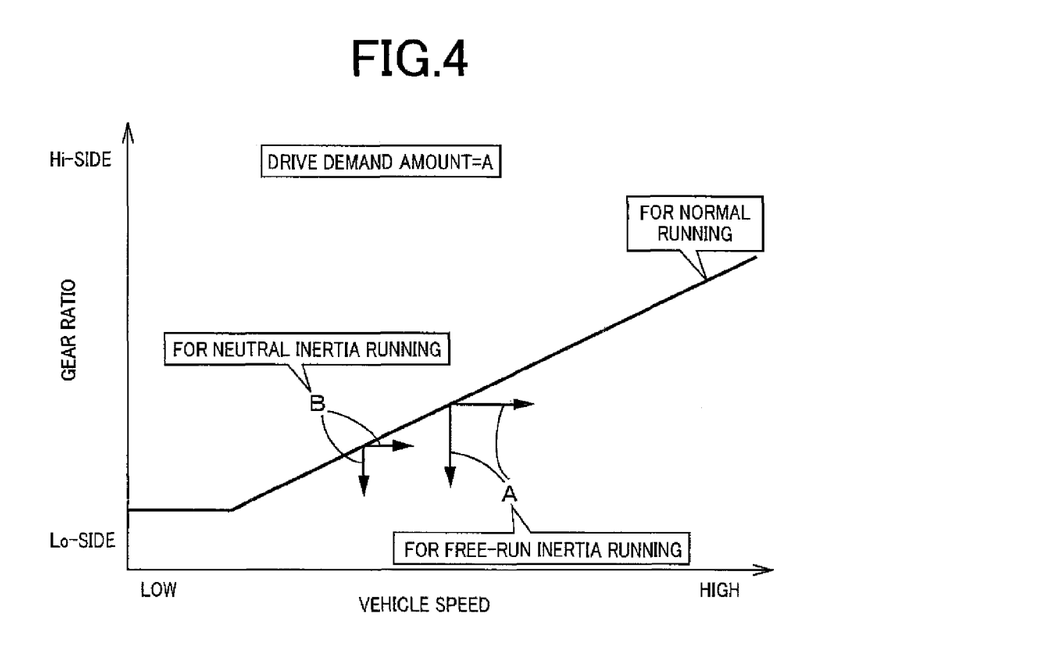
FIG. 4 is a diagram when the automatic transmission is a continuously variable transmission, and the figure being similar to FIG. 3.
Figure 5:
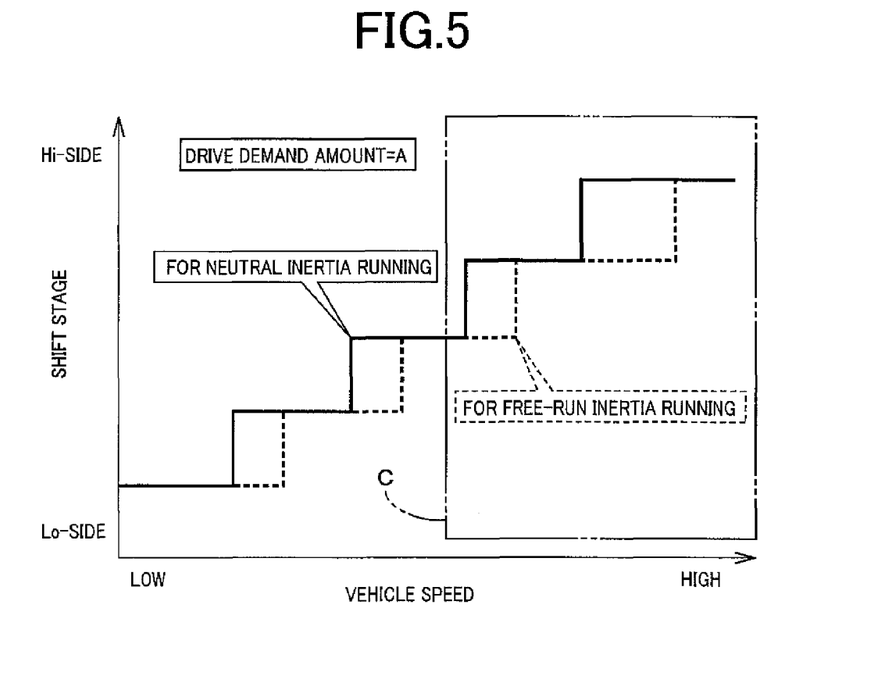
FIG. 5 depicts the case of using an inertia running shift map, and the figure being similar to FIG. 3.
Figure 6:
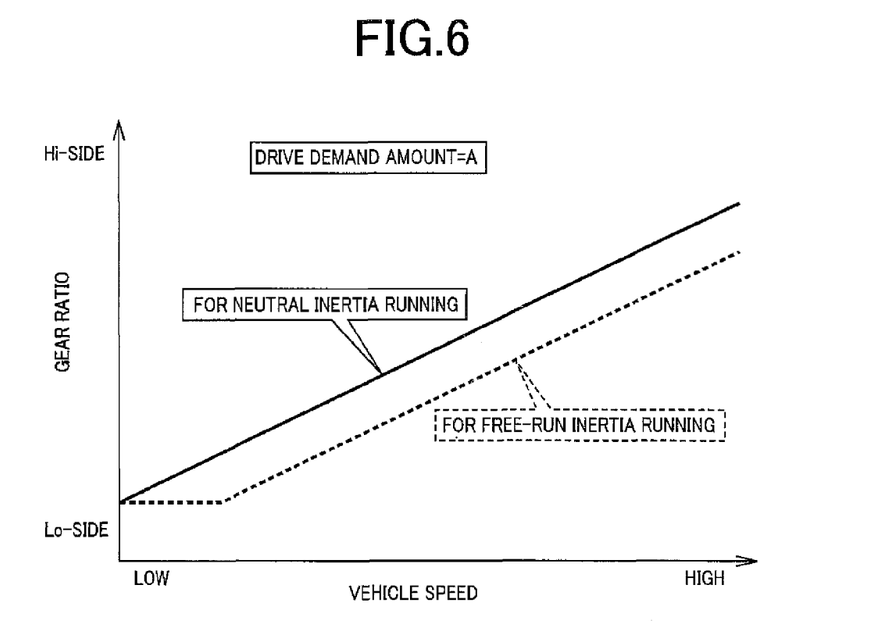
FIG. 6 depicts the case of using the inertia running shift map, and the figure being similar to FIG. 4.

The gear ratio e of the automatic transmission 16 set in the return-time gear ratio change control will hereinafter be described in detail. FIGS. 3, 4, 5, and 6 are diagrams for explaining the gear ratio e of the automatic transmission 16 set at the time of return from the inertia running mode. FIG. 3 is a diagram when the automatic transmission 16 is a stepped transmission, and depicts the case of using a normal running shift map. FIG. 4 is a diagram when the automatic transmission 16 is a continuously variable transmission, and depicts the case of using the normal running shift map. FIG. 5 is a diagram when the automatic transmission 16 is a stepped transmission, and depicts the case of using an inertia running shift map. FIG. 6 is a diagram when the automatic transmission 16 is a continuously variable transmission, and depicts the case of using the inertia running shift map. Even if the automatic transmission 16 is a continuously variable transmission, the gear ratio can be set in stages in a stepped manner and, therefore, the shift maps of FIGS. 3 and 5 are applicable even when the automatic transmission 16 is a continuously variable transmission.

In FIGS. 3 and 4, a solid line represents the normal running shift map used in the shift control during the normal running mode and indicates an example when the drive demand amount is a certain value A. At the time of return from the free-rum inertia running mode, for example, as indicated by arrows A of FIG. 3, a gear stage on the low vehicle speed side is set relative to a gear stage (having the same meaning as a gear ratio) determined from the normal running shift map. On the other hand, at the time of return from the neutral inertia running mode, for example, as indicated by arrows B of FIG. 3, a gear stage on the high vehicle speed side is set relative to the gear stage determined from the normal running shift map. Alternatively, the gear stage determined from the normal running shift map may be set at the time of return from the neutral inertia running mode, while a gear stage on the low vehicle speed side may be set relative to the gear stage determined from the normal running shift map at the time of return from the free-run inertia running mode. Alternatively, the gear stage determined from the normal running shift map may be set at the time of return from the free-run inertia running mode, while a gear stage on the high vehicle speed side may be set relative to the gear stage determined from the normal running shift map at the time of return from the neutral inertia running mode. Alternatively, as indicated by arrows A and B of FIG. 4, in the both cases of return from the free-run inertia running mode and return from the neutral inertia running mode, a gear ratio on the low vehicle speed side may be set relative to the gear ratio determined from the normal running shift map, while a gear ratio on the lower vehicle speed side may be set relative to the gear ratio determined from the normal running shift map in the case of return from the free-run inertia running mode as compared to the case of return from the neutral inertia running mode.

Alternatively, as depicted in FIGS. 5 and 6, a predefined free-run inertia running shift map as indicated by a broken line and a predefined neutral inertia running shift map as indicated by solid lines may be defined and stored in advance for determining a gear stage (having the same meaning as a gear ratio) of the automatic transmission 16 at the time of return from the free-run inertia running mode to the normal running mode and for determining a gear stage (having the same meaning as a gear ratio) of the automatic transmission 16 at the time of return from the neutral inertia running mode to the normal running mode, respectively. Both the free-run inertia running shift map and the neutral inertia running shift map indicate an example when the drive demand amount is the certain value A. The free-run inertia running shift map has the gear ratio e of the automatic transmission 16 set on the low vehicle speed side as compared to the neutral inertia running shift map. Either the free-run inertia running shift map or the neutral inertia running shift map may be the same as the normal running shift map.

The return-time gear ratio change control may not necessarily be provided at the time of return to the normal running mode associated with an increase in the drive demand amount and may be provided at the time of return when the vehicle state is within a region C surrounded by dashed-two dotted lines of FIGS. 3 and 5, for example. Therefore, the maps as depicted in FIGS. 3 and 5 may be set only within the region C, for example. As described above, the free-run inertia running mode and the neutral inertia running mode are performed in the regions of completely different vehicle states or the regions of vehicle states partially overlapping with each other, or either one is performed in the region of the same vehicle state based on the necessity of the warm-up of the engine 14 etc. If the free-run inertia running mode and the neutral inertia running mode cannot be performed in the region of the same vehicle state, the gear ratio set at the time of return from the free-run inertia running mode is possibly on the higher vehicle speed side than the gear ratio set at the time of return from the neutral inertia running mode. The technical concept of the return-time gear ratio change control is to prescribe how to set the gear ratio used at the time of return to the normal running mode, rather than to compare the absolute values of the gear ratios. Therefore, even if the free-run inertia running mode and the neutral inertia running mode cannot be performed in the region of the same vehicle state, the technical concept of the return-time gear ratio change control is reflected. In other words, for example, even if any one of the free-run inertia running mode and the neutral inertia running mode is performed only in the region C and the other is performed only outside the region C, the technical concept of the return-time gear ratio change control is reflected. In this case, the map corresponding to each mode of running may be set only in the region in which the mode of running is performed.

Figure 7:
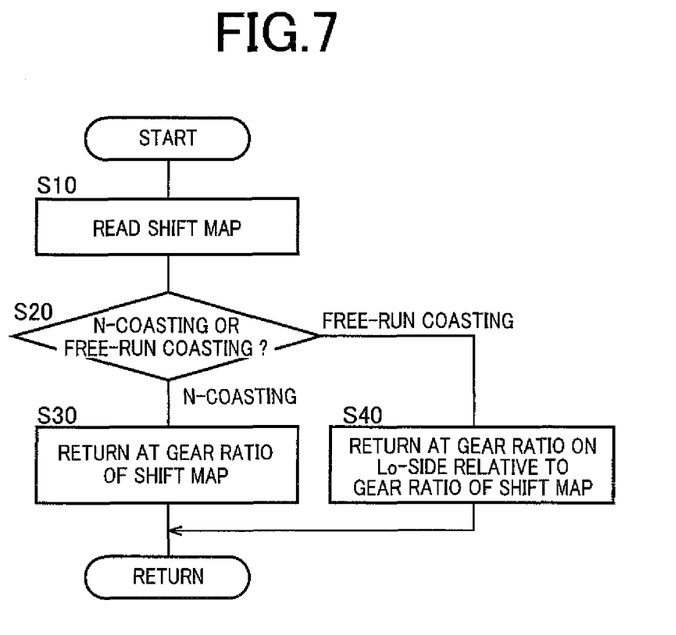
FIG. 7 is a flowchart for explaining a main portion of the control operation of an electronic control device, i.e., the control operation for preventing a user from having a feeling of strangeness at the time of return from the inertia running mode to the normal running mode in terms of the responsiveness and the engagement shock.
Figure 8:
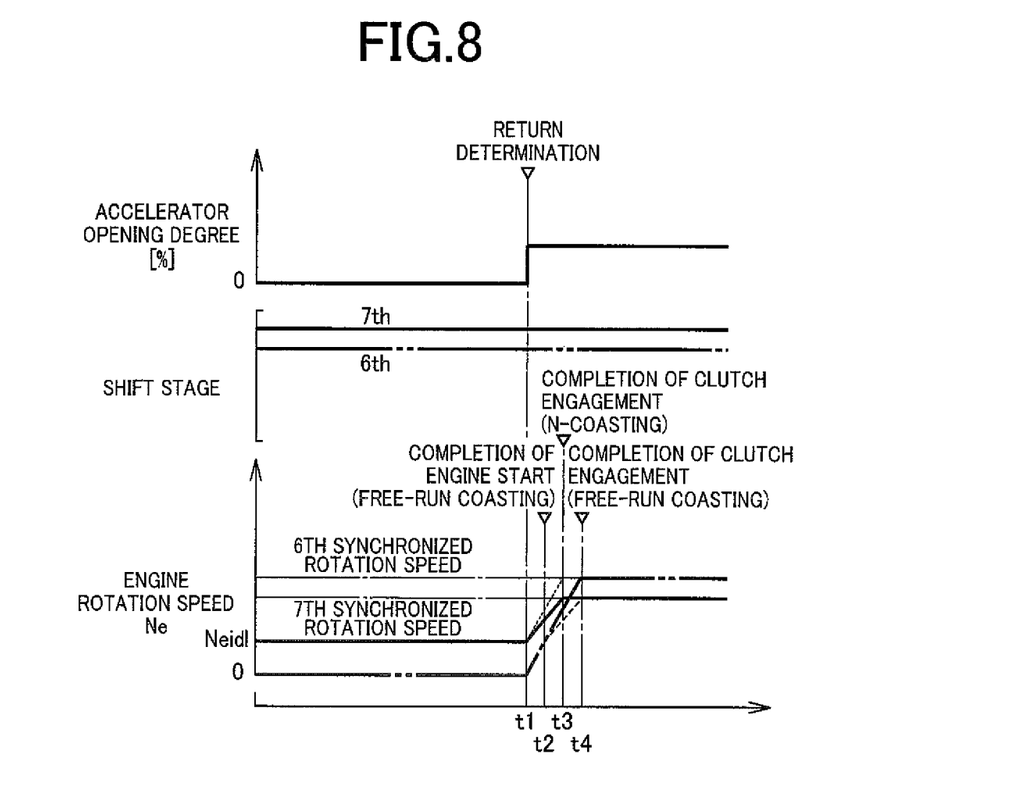
FIG. 8 is a time chart when the control operation depicted in the flowchart of FIG. 7 is executed.

FIG. 7 is a flowchart for explaining a main portion of the control operation of the electronic control device 70, i.e., the control operation for preventing a user from having a feeling of strangeness at the time of return from the inertia running mode to the normal running mode in terms of the responsiveness and the engagement shock, and is repeatedly executed with an extremely short cycle time, for example, on the order of a few msec to a few tens of msec. The flowchart of FIG. 7 is based on the assumption that the inertia running mode is performed because the accelerator is turned off during the normal running mode. FIG. 8 is a time chart when the control operation depicted in the flowchart of FIG. 7 is executed.

In FIG. 7, first, at step (hereinafter, step will be omitted) S10 corresponding to the shift control portion 74, for example, the normal running shift map is read. At S20 corresponding to the running mode determining portion 80, the running mode of actual inertia running being performed is determined out of the free-run inertia running mode and the neutral inertia running mode. If it is determined at S20 that the running mode is the neutral inertia running mode, for example, the gear ratio determined from the normal running shift map is set as the gear ratio of the automatic transmission 16 at the time of return to the normal running mode at S30 corresponding to the shift control portion 74. If it is determined at S20 that the running mode is the free-run inertia running mode, for example, a gear ratio on the low vehicle speed side is set relative to the gear ratio determined from the normal running shift map as the gear ratio of the automatic transmission 16 at the time of return to the normal running mode at S40 corresponding to the shift control portion 74. At S30 and S40, for example, the hydraulic friction engagement devices of the automatic transmission 16 involved with the establishment of the set gear stage are engaged before returning to the normal running mode except the clutch C1.

In FIG. 8, a solid line indicates an example in the case of the neutral inertia running mode; a dashed-two dotted line indicates an example in the case of the free-run inertia running mode; a broken line with short line segments indicates a comparison example in the case of the neutral inertia running mode; and a broken line with long line segments indicates a comparison example in the case of the free-run inertia running mode. In the examples of the neutral inertia running mode, a seventh-speed gear stage (7th) determined from the normal running shift map is set as the gear stage of the automatic transmission 16 at the time of return to the normal running mode. In the comparison examples of the neutral inertia running mode, a sixth-speed gear stage (6th) on the lower vehicle speed side than the above examples is set as the gear stage of the automatic transmission 16 at the time of return to the normal running mode. In the case of the neutral inertia running mode, the engine 14 is operated in the idling state, and a time from a return determination (time t1) to the completion of engagement of the clutch C1 (time t3) is made relatively short. Therefore, even when the absolute value of the drive force capable of being generated after the engagement of the clutch C1 is not made larger as in the example, the responsiveness until generation of the user's desired drive force is originally favorable. Although the absolute value of the drive force capable of being generated after the engagement of the clutch C1 is made larger to further improve the responsiveness in the comparison example as compared to the example, the engagement shock of the clutch C1 is increased. Therefore, in terms of satisfying both the improvement in the responsiveness and the suppression of the engagement shock at the time of return to the normal running mode, it is appropriate for the neutral inertia running mode to employ the form of the example rather than the form of the comparison example. On the other hand, in the example of the free-run inertia running mode, the sixth-speed gear stage on the lower vehicle speed side than the seventh-speed gear stage determined from the normal running shift map is set as the gear stage of the automatic transmission 16 at the time of return to the normal running mode. In the comparison example of the free-run inertia running mode, the seventh-speed gear stage determined from the normal running shift map is set as the gear stage of the automatic transmission 16 at the time of return to the normal running mode. Since the engine 14 is stopped in the case of the free-run inertia running mode and a time (time t1 to time t2) is required for starting the engine 14 after the return determination (time t1), a time until the completion of engagement of the clutch C1 (time t4) is made relatively long. Therefore, the responsiveness until generation of the user's desired drive force is improved by increasing the absolute value of the drive force capable of being generated after the engagement of the clutch C1 as in the example. Although the engagement shock of the clutch C1 is suppressed in the comparison example as compared to the example, the absolute value of the drive force capable of being generated after the engagement of the clutch C1 is made smaller and the responsiveness is further deteriorated. Therefore, in terms of satisfying both the improvement in the responsiveness and the suppression of the engagement shock at the time of return to the normal running mode, it is appropriate also for the free-run inertia running mode to employ the form of the example rather than the form of the comparison example. In short, at the time of return from the free-run inertia running mode, a gear stage on the low vehicle speed side is used for putting importance on the drivability. As a result, although the engagement shock of the clutch C1 possibly increases, the engine start shock is originally generated and, therefore, the engagement shock of the clutch C1 is not noticeable.

As described above, according to this example, by changing the gear ratio e of the automatic transmission 16 at the time of return to the normal running mode based on the state of the engine 14 during an inertia running mode, the gear ratio on the low vehicle speed side is used in the case of the free-run inertia running mode for returning to the normal running mode so as to put importance on the improvement in the responsiveness until generation of the desired drive force, while the gear ratio on the high vehicle speed side is used in the case of the neutral inertia running mode for returning to the normal running mode so as to put importance on the suppression of the shock (e.g., the engagement shock of the clutch C1) generated when the engine 14 is coupled to the wheels 20. Therefore, a user can be prevented from having a feeling of strangeness at the time of return from the inertia running mode to the normal running mode in terms of the responsiveness and the shock. In other words, both the improvement in the responsiveness and the suppression of the shock can be satisfied at the time of return from the inertia running mode to the normal running mode.

According to this example, the return-time gear ratio change control is provided at the time of return to the normal running mode associated with an increase in the drive demand amount while the gear ratio e of the automatic transmission 16 is set to the gear ratio for the normal running mode at the time of return to the normal running mode associated with a condition other than an increase in the drive demand amount and, therefore, although if the return-time gear ratio change control is provided when it is not the time of return to the normal running mode associated with an increase in the drive demand amount, the engagement shock of the clutch C1 varies due to a difference in the state of the engine 14 and possibly gives a feeling of strangeness to a user, the feeling of strangeness is avoided because the return-time gear ratio change control is not provided so as not to put importance on the responsiveness until generation of the desired drive force when it is not the time of return to the normal running mode associated with an increase in the drive demand amount.

According to this example, since the gear ratio e of the automatic transmission 16 is set on the low vehicle speed side relative to the gear ratio determined from the normal running shift map in the case of return from the free-run inertia running mode as compared to the case of return from the neutral inertia running mode, the gear ratio e of the automatic transmission 16 can certainly be set on the low vehicle speed side in the case of return from the free-run inertia running mode as compared to the case of return from the neutral inertia running mode.

According to this example, since the free-run inertia running shift map has the gear ratio e of the automatic transmission 16 set on the low vehicle speed side as compared to the neutral inertia running shift map, the gear ratio e of the automatic transmission 16 can certainly be set on the low vehicle speed side in the case of return from the free-run inertia running mode as compared to the case of return from the neutral inertia running mode.

According to this example, since the gear ratio e of the automatic transmission 16 at the time of return from the neutral inertia running mode is the gear ratio e of the automatic transmission 16 for the normal running mode, the gear ratio e of the automatic transmission 16 can be set on the low vehicle speed side in the case of return from the free-run inertia running mode.

Another example of the present invention will be described. In the following description, the portions mutually common to the examples are denoted by the same reference numerals and will not be described.

Second Example

Although the gear ratio at the time of return is preliminarily established in the automatic transmission 16 except the engagement of the clutch C1 during the inertia running mode before returning to the normal running mode in the first example, alternatively, the gear ratio at the time of return is established in the automatic transmission 16 immediately before returning to the normal running mode (preferably, when a return to the normal running mode is determined) in this example.

Figure 9:
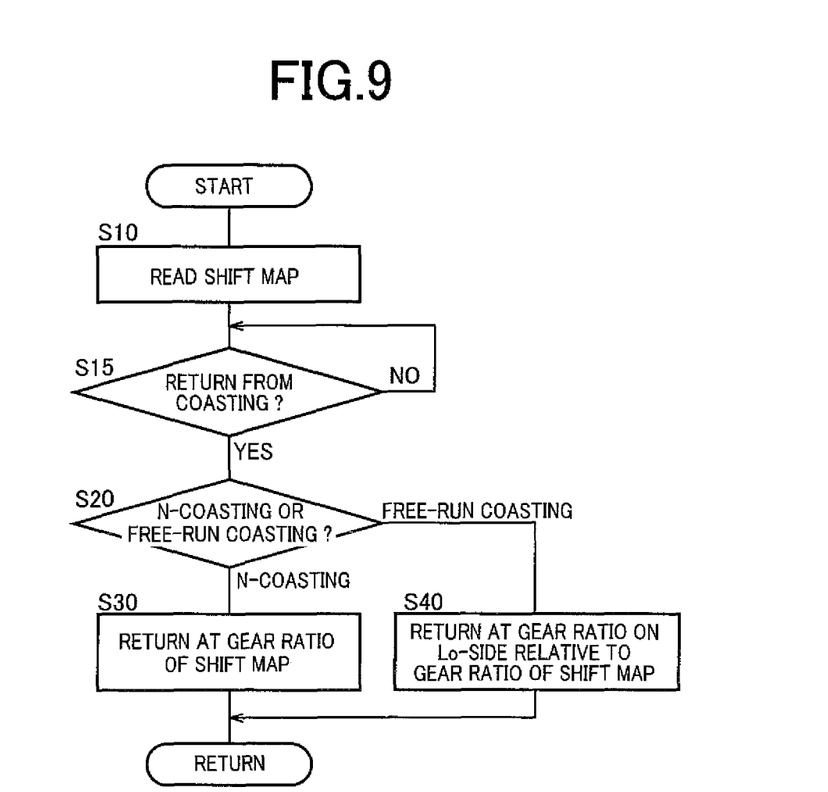
FIG. 9 is a flowchart for explaining a main portion of the control operation of the electronic control device, i.e., the control operation for preventing a user from having a feeling of strangeness at the time of return from the inertia running mode to the normal running mode in terms of the responsiveness and the engagement shock, and depicts another example corresponding to FIG. 7.

FIG. 9 is a flowchart for explaining a main portion of the control operation of the electronic control device 70, i.e., the control operation for preventing a user from having a feeling of strangeness at the time of return from the inertia running mode to the normal running mode in terms of the responsiveness and the engagement shock, and is repeatedly executed with an extremely short cycle time, for example, on the order of a few msec to a few tens of msec. FIG. 9 depicts another example corresponding to FIG. 7 and steps different from FIG. 7 will mainly be described.

In FIG. 9, after S10 described above, a return from the inertia running mode is determined at S15 corresponding to the running mode determining portion 80. If the determination of S15 is negative, S15 is repeatedly executed. If a return from the inertia running mode is determined and the determination of S15 is affirmative, the running mode of actual inertia running being performed is determined out of the free-run inertia running mode and the neutral inertia running mode at S20 corresponding to the running mode determining portion 80. At S30 and S40, for example, the hydraulic friction engagement devices of the automatic transmission 16 involved with the establishment of the set gear stage are engaged for returning to the normal running mode.

As described above, since this example is different from the first example only in the timing of establishing the gear ratio at the time of return in the automatic transmission 16 and the return-time gear ratio change control is provided in the same way, the same effect as the first example is acquired.

Although the examples of the present invention have been described in detail with reference to the drawings, the present invention is also applied in other forms.

For example, although the clutch C1 making up a portion of the automatic transmission 16 is exemplified as the connecting/disconnecting device separating the engine 14 and the wheels 20 in the examples, this is not a limitation. For example, the clutch C1 may be disposed independently of the automatic transmission 16. If the automatic transmission 16 is, for example, a belt type continuously variable transmission, the clutch C1 is disposed independently of the automatic transmission 16, and the connecting/disconnecting device may be a known forward/backward switching device included in the vehicle along with the belt type continuously variable transmission, or an engagement device included in the forward/backward switching device.

The above description is merely an embodiment and the present invention can be implemented in variously modified and improved forms based on the knowledge of those skilled in the art.

NOMENCLATURE OF ELEMENTS

10: vehicle
14: engine
16: automatic transmission (transmission)
20: wheels
70: electronic control device (running control device)
C1: clutch (connecting/disconnecting device)

The invention claimed is:

1. A running control device of a vehicle including an engine, a connecting/disconnecting device separating the engine and wheels, and a transmission selectively transmitting power of the engine toward the wheels, the running control device comprising:
 a processor configured to execute a normal running mode performed by using the power of the engine with the engine and the wheels coupled, a free-run inertia running mode that is an inertia running mode performed by separating the engine and the wheels and stopping the engine during running, and a neutral inertia running mode that is an inertia running mode performed by separating the engine and the wheels and operating the engine in a self-sustaining manner during running, and
 the processor configured to set a gear ratio of the transmission on a lower vehicle speed side in a first case of return from the free-run inertia running mode to the normal running mode as compared to a second case of return from the neutral inertia running mode to the normal running mode.

2. The running control device of a vehicle of claim 1, wherein
 one of a plurality of conditions for returning to the normal running mode is a condition that is an increase in a drive demand amount, wherein the processor is configured to set the gear ratio of the transmission on the lower vehicle speed side at a time of return to the normal running mode associated with the increase in the drive demand amount, and the processor is configured set the gear ratio of the transmission to a gear ratio for the normal running mode at the time of return to the normal running mode associated with a condition other than the increase in the drive demand amount.

3. The running control device of a vehicle of claim 1, wherein the processor is configured with a predefined relationship determining a gear ratio of the transmission for the normal running mode, and wherein the processor is configured to set the gear ratio of the transmission on the lower vehicle speed side relative to the gear ratio determined from the predefined relationship in the first case of return from the free-run inertia running mode to the normal running mode as compared to the second case of return from the neutral inertia running mode to the normal running mode.

4. The running control device of a vehicle of claim 1, wherein the processor is configured with a predefined relationship for free-run inertia running mode determining a gear ratio of the transmission at a time of a first return from the free-run inertia running mode to the normal running mode and a predefined relationship for neutral inertia running mode determining a gear ratio of the transmission at a time of a second return from the neutral inertia running mode to the normal running mode, and wherein the relationship for free-run inertia running mode has a gear ratio of the transmission set on the lower vehicle speed side as compared to the relationship for neutral inertia running mode.

5. A running control device of a vehicle including an engine, a connecting/disconnecting device separating the engine and wheels, and a transmission selectively transmitting power of the engine toward the wheels, the running control device comprising:

a processor configured to execute a normal running mode performed by using the power of the engine with the engine and the wheels coupled, a free-run inertia running mode that is an inertia running mode performed by separating the engine and the wheels and stopping the engine during running, and a neutral inertia running mode that is an inertia running mode performed by separating the engine and the wheels and operating the engine in a self-sustaining manner during running, the processor is configured with a predefined relationship determining a gear ratio of the transmission for the normal running mode, and the processor being configured to set the gear ratio of the transmission on a lower vehicle speed side relative to the gear ratio determined from the predefined relationship in a first case of return from the free-run inertia running mode to the normal running mode as compared to a second case of return from the neutral inertia running mode to the normal running mode.

6. A running control device of a vehicle including an engine, a connecting/disconnecting device separating the engine and wheels, and a transmission selectively transmitting power of the engine toward the wheels, the running control device comprising:

a processor configured to execute a normal running mode performed by using the power of the engine with the engine and the wheels coupled, a free-run inertia running mode that is an inertia running mode performed by separating the engine and the wheels and stopping the engine during running, and a neutral inertia running mode that is an inertia running mode performed by separating the engine and the wheels and operating the engine in a self-sustaining manner during running, the processor is configured with a predefined relationship for free-run inertia running mode determining a gear ratio of the transmission at a time of a first return from the free-run inertia running mode to the normal running mode and a predefined relationship for neutral inertia running mode determining a gear ratio of the transmission at a time of a second return from the neutral inertia running mode to the normal running mode, and the relationship for free-run inertia running mode having the gear ratio of the transmission set on the lower vehicle speed side as compared to the relationship for neutral inertia running mode.

7. The running control device of a vehicle of claim 1, wherein the processor is configured to set a gear ratio of the transmission determined from a predefined relationship for the normal running mode at a time of return from the neutral inertia running mode to the normal running mode to a gear ratio of the transmission for the normal running mode.

* * * * *